US012397764B2

(12) United States Patent
Ganzel (10) Patent No.: US 12,397,764 B2
(45) Date of Patent: Aug. 26, 2025

(54) BRAKE SYSTEM WITH NORMAL NON-FAILURE AND MANUAL FRONT PUSH-THROUGH MODES

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 523 days.

(21) Appl. No.: 17/852,477

(22) Filed: Jun. 29, 2022

(65) Prior Publication Data

US 2024/0001901 A1    Jan. 4, 2024

(51) Int. Cl.
*B60T 13/68*    (2006.01)
*B60T 8/40*     (2006.01)
*B60T 13/14*    (2006.01)

(52) U.S. Cl.
CPC .......... *B60T 13/686* (2013.01); *B60T 8/4086* (2013.01); *B60T 13/142* (2013.01)

(58) Field of Classification Search
CPC .... B60T 13/686; B60T 8/4086; B60T 13/142; B60T 8/4081; B60T 13/70
See application file for complete search history.

(56) References Cited

U.S. PATENT DOCUMENTS

| 10,730,501 B2 | 8/2020 | Ganzel |
| 2015/0224972 A1 | 8/2015 | Feigel |
| 2020/0307538 A1 | 10/2020 | Ganzel |
| 2021/0155215 A1* | 5/2021 | Ganzel ................... B60T 11/20 |
| 2021/0261109 A1* | 8/2021 | Ganzel ................... B60T 7/042 |

FOREIGN PATENT DOCUMENTS

| DE | 102022206558 A1 | 1/2023 |
| DE | 102022208245 A1 | 2/2023 |
| DE | 102023200277 A1 | 7/2023 |

OTHER PUBLICATIONS

Search report for corresponding German application No. 102023205490.6, dated May 24, 2024, 12 pages.

* cited by examiner

*Primary Examiner* — Pamela Rodriguez
(74) *Attorney, Agent, or Firm* — Tarolli, Sundheim, Covell & Tummino LLP (57) ABSTRACT

A brake system includes a reservoir and a master cylinder operable to provide a brake signal responsive to actuation of a brake pedal connected thereto. A power transmission unit is configured for selectively providing pressurized hydraulic fluid for actuating at least one of the pair of front wheel brakes and the pair of rear wheel brakes in a normal non-failure braking mode. A iso/dump valve arrangement is hydraulically interposed between the power transmission unit and a corresponding one of the wheel brakes. A fluid separator is hydraulically interposed between a selected one of the pair of front wheel brakes and a corresponding iso/dump valve arrangement. A normally open base brake iso valve is energized closed during normal non-failure braking mode. The base brake iso valve is open to place the master cylinder into fluid communication with at least one of the fluid separators during manual push-through braking mode.

19 Claims, 4 Drawing Sheets

BRAKE SYSTEM WITH NORMAL NON-FAILURE AND MANUAL FRONT PUSH-THROUGH MODES

TECHNICAL FIELD

This disclosure relates to an apparatus and method for use of a brake system and, more particularly, to a method and apparatus of a hydraulic brake system for actuating at least one of a pair of front wheel brakes and a pair of rear wheel brakes in normal non-failure and manual push-through modes.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 2020 to Blaise Ganzel and titled "Vehicle Brake System with Auxiliary Pressure Source", and in U.S. Patent Application Publication No. 2020/0307538, published 1 Oct. 2020 by Blaise Ganzel and titled "Brake System with Multiple Pressure Sources", both of which are incorporated herein by reference in their entirety for all purposes.

It may be desirable for a brake system to include various features to facilitate continued operation of at least one of the wheel brakes even after a partial or complete failure of another portion of the brake system.

SUMMARY

In an aspect, a brake system for actuating at least one of a pair of front wheel brakes and a pair of rear wheel brakes in normal non-failure and manual push-through modes is disclosed. The system includes a reservoir and a master cylinder operable to provide a brake signal responsive to actuation of a brake pedal connected thereto, the master cylinder being selectively operable during a manual push-through mode by actuation of the brake pedal to generate brake actuating pressure to at least one output for hydraulically actuating the pair of front wheel brakes. A power transmission unit is configured for selectively providing pressurized hydraulic fluid for actuating at least one of the pair of front wheel brakes and the pair of rear wheel brakes in a normal non-failure braking mode. A plurality of iso/dump valve arrangements is provided. Each iso/dump valve arrangement is hydraulically interposed between the power transmission unit and a corresponding one of the wheel brakes. A plurality of fluid separators is provided. Each fluid separator is hydraulically interposed between a selected one of the pair of front wheel brakes and a corresponding iso/dump valve arrangement. A normally open base brake iso valve is provided. The base brake iso valve is energized closed during normal non-failure braking mode. The base brake iso valve is open to place the master cylinder into fluid communication with at least one of the fluid separators during manual push-through braking mode. An electronic control unit is provided for selectively controlling at least one of the power transmission unit, at least one of the plurality of iso/dump valve arrangements, and the base brake iso valve responsive to the brake signal.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
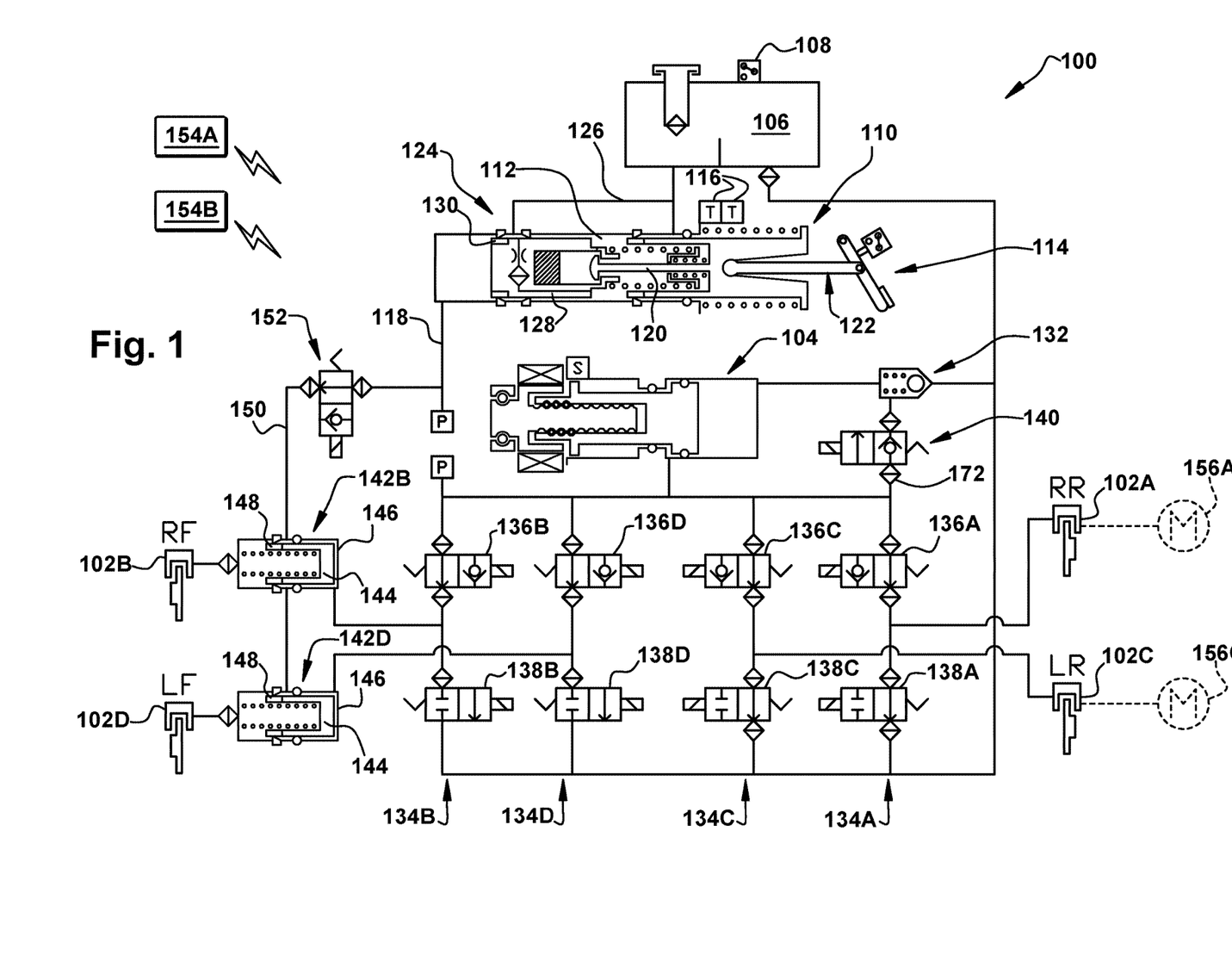
FIG. 1 is a schematic hydraulic diagram of a brake system according to an aspect of the present invention, in a first configuration.
Figure 2:
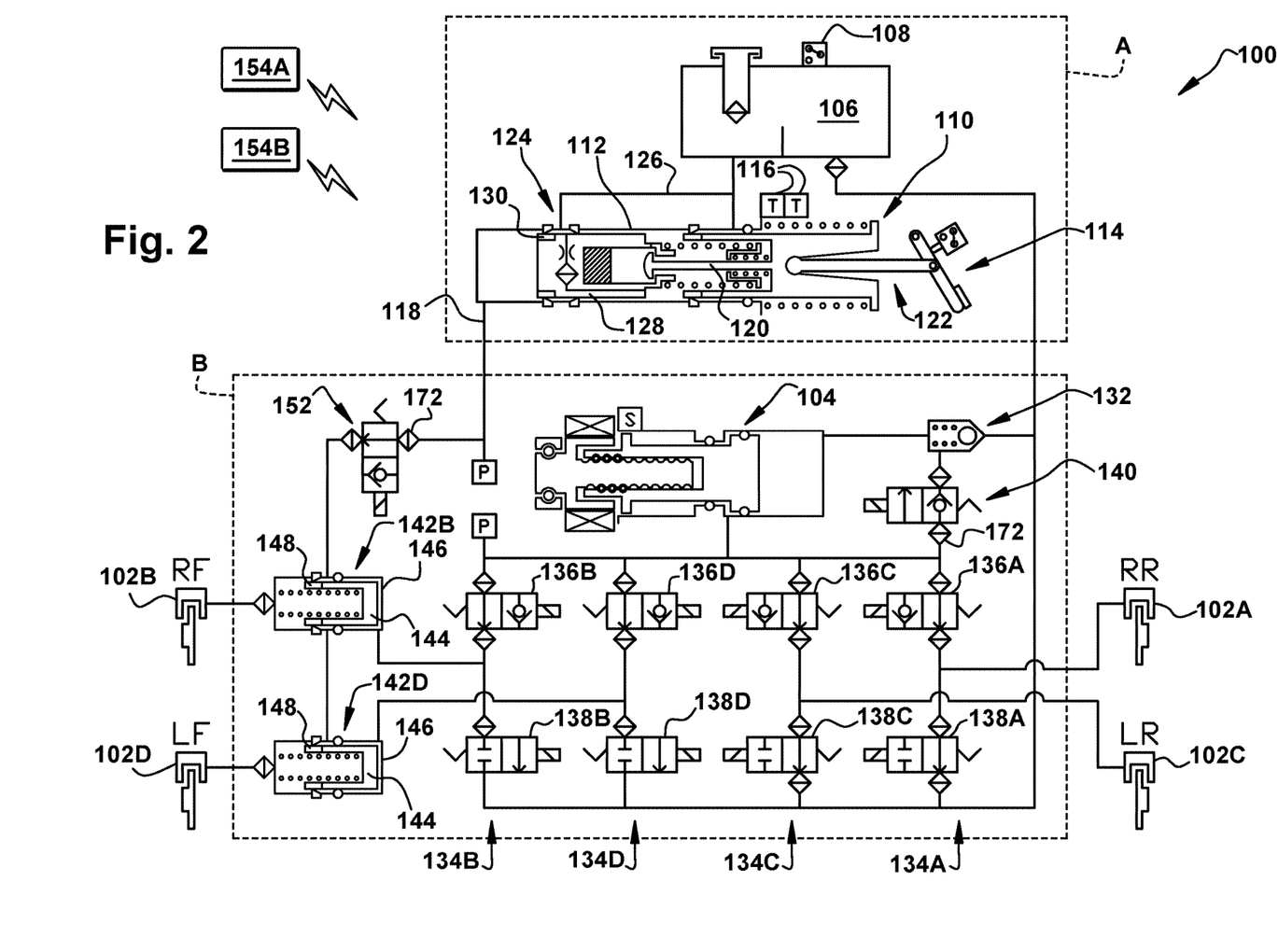
FIG. 2 is a schematic hydraulic diagram of the brake system of FIG. 1, in a second configuration.

FIGS. 1-2 schematically depict a brake system 100 for actuating a pair of front wheel brakes and a pair of rear wheel brakes, in first and second configurations, respectively. The brake system 100 is shown here as a hydraulic braking system in which fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the brake system 100 is installed. For example, the brake system 100 may be configured as shown, such that a power transmission unit 104 is configured for selectively providing pressurized hydraulic fluid for actuating at least one of the pair of front wheel brakes 102B and 102D and to the pair of rear wheel brakes 102A and 102C, in a non-failure normal braking mode, as will be discussed below. In the depicted embodiments of the brake system 100, the power transmission unit 104 provides fluid to both of the pair of front wheel brakes 1028 and 102D and the pair of rear wheel brakes 102A and 102C, in the normal non-failure braking mode. The brake system 100 is configured for actuating at least one of the pair of front wheel brakes 1028 and 102D and the pair of rear wheel brakes 102A and 102C in both normal non-failure and manual push-through modes, as will be described herein.

In this example, the wheel brake 102A may be associated with a right rear wheel of the vehicle in which the brake system 100 is installed, and the wheel brake 1028 may be associated with the right front wheel. The wheel brake 102C may be associated with the left rear wheel, and the wheel brake 102D may be associated with the left front wheel. Alternatively, though not depicted here, the brake system 100 may be configured such that the wheel brakes 102A and 1028 are associated with wheels at the front or rear axle of the vehicle, and the wheel brakes 102C and 102D are associated with wheels at the other axle of the vehicle. (It is contemplated that various other components, such as electric brake motors, could be reconfigured by one of ordinary skill in the art to accommodate such an altered system in certain use environments.)

A reservoir 106 stores and holds hydraulic fluid for the brake system 100. The fluid within the reservoir 106 is preferably held at or about atmospheric pressure, but the fluid may be stored at other pressures if desired. The reservoir 106 is shown schematically having two tanks or sections with fluid conduit lines connected thereto. The sections can be separated by several interior walls within the reservoir 106 and are provided to prevent complete drainage of the reservoir 106 in case one of the sections is depleted due to a leakage via one of the lines connected to the reservoir 106. Alternatively, the reservoir 106 may include multiple separate housings. The reservoir 106 may include at least one fluid level sensor 108 for detecting the fluid level of one or more of the sections of the reservoir 106.

As shown schematically in FIG. 1, the brake system 100 includes a master cylinder 110 with a housing 112 defining a longitudinally extending bore for slidably receiving various cylindrical pistons and other components therein. Examples of such components are the MC springs (three shown) longitudinally extending at least partially in series within the bore, as shown in the Figures. Note that the housing 112 is not specifically schematically shown in the Figures, but instead the walls of the longitudinally extending bore are schematically illustrated. The housing 112 may be formed as a single unit or include two or more separately formed portions coupled together. For some use environments, the master cylinder 110 may be of a single circuit master cylinder type.

A brake pedal 114 is operatively connected to the master cylinder 110 and is actuated by the driver of the vehicle as the driver presses on the brake pedal 114. A brake travel sensor 116 (two shown, for redundancy) is configured provide a brake signal to other portions of the brake system 100, indicating a depression of the brake pedal 114 (binary on/off, and/or including some quantitative information related to the brake pedal 114 depression). That is, the master cylinder 110 is operable to provide a brake signal responsive to actuation of the brake pedal 114 connected thereto. The brake signal may be utilized by one or more other components of the brake system 100 to effectuate desired braking of the motor vehicle, such as via transmission of electronic signals when the brake system 100 is in a normal non-failure braking mode.

The brake pedal 114 and related structures of the master cylinder 110 may also instead be used as a back-up source of pressurized fluid to essentially replace the normally supplied source of pressurized fluid from the power transmission unit 104 under certain failed conditions of the brake system 100, and/or upon initial startup of the brake system 100. This situation is referred to as a manual push-through event, or a "manual apply" and may be accomplished in coordination with actuation of any backup source of pressurized fluid available, or independently thereof. The master cylinder 110 is selectively operable during a manual push-through mode by actuation of the brake pedal 114 to generate brake actuating pressure to at least one MC output 118 for hydraulically actuating at least one of the wheel brakes 102 of the brake system 100

In such a manual push-through mode, the master cylinder 110 can supply pressurized fluid to the MC output 118, which is then routed to the hydraulically operated pair of front wheel brakes 1028, 102D as desired. This flow is pushed through, largely under mechanical pressure upon the brake pedal 114 from the driver's foot, from the master cylinder 110. That is, the master cylinder 110 is selectively operable during a manual push-through mode by actuation of the brake pedal 114 connected to the master cylinder 110 to generate brake actuating pressure for hydraulically actuating at least one of the pair of front wheel brakes 1028, 102D and the pair of rear wheel brakes 102A, 102C. (The below description presumes that the pair front wheel brakes 1028, 102D are the hydraulically actuated ones of the brakes in the manual push-through mode, for ease of description.)

An MC primary piston 120 is connected with a brake pedal 114 via a linkage arm 122. The MC primary piston 120 is slidably disposed in the bore of the housing 112 of the master cylinder 110. When the brake pedal 114 is in its rest position (the driver is not depressing the brake pedal 114), the structures of the master cylinder 110 permit at least a portion of fluid communication between the bore of the housing 112 and the reservoir 106 via a reservoir conduit 126. Leftward movement (in the orientation of the Figures) of the MC primary piston 126 due to pressure by the driver's foot upon the brake pedal 114 may cause, under certain conditions, a pressure increase within the master cylinder 110, which results in egress of pressurized fluid from the longitudinal bore of the master cylinder 110 via MC output 118.

A pedal simulator 124 may be in selective fluid communication with the master cylinder 110. As shown, the pedal simulator 110 is integrated bodily into the master cylinder 110 to provide a desired level of fluid communication, but it is contemplated that the "selective fluid communication" could also or instead be provided via connection of a separately located pedal simulator (not shown) to the master cylinder 120 via one or more hydraulic passages. Regardless of the exact nature of connection, the pedal simulator 124 may be in selective fluid communication with the master cylinder 110 for providing predetermined brake pedal 114 response to the driver (e.g., brake pedal "feel"). For example, and as shown in the Figures, the pedal simulator 124 is integrated into the master cylinder 110, and extends substantially coaxially with the longitudinally extending bore of the master cylinder 110.

The pedal simulator 124 shown in the Figures as being integrated into the master cylinder 110 includes a simulator piston 128 having at least one simulator port 130. The simulator piston 128 travels reciprocally longitudinally within the housing 112 of the master cylinder 110 responsive to a driver's foot pressure upon the brake pedal 114 and/or fluid pressures and other portions of the brake system 100. When the simulator port 130 travels far enough leftward (in the orientation of the Figures) to be sealed off from fluid communication with the reservoir conduit 126, the simulator piston 128 will normally substantially cease leftward travel and instead provide increased resistance to leftward travel of the brake pedal 114 and MC primary piston 120. This provides desired fluid response and pedal simulator function within the master cylinder 110 itself.

The housing 112 and other components associated with the master cylinder 110 may include any desired number and arrangement of seals, orifices, filters, passages, springs, resilient cushions (e.g., the shaded area of the Figures within the pedal simulator 124), rods, spring cages, ports, and other structures for helping to achieve desired push-through capabilities and characteristics, pedal response "feel" for a driver, and pressurization/travel of hydraulic fluid within the brake system 100 as desired.

The power transmission unit 104 is configured for selectively providing pressurized hydraulic fluid for actuating at least one of the pair of front wheel brakes 1028, 102D and the pair of rear wheel brakes 102A, 102C in a normal non-failure braking mode. That is, the power transmission unit 104 of the brake system 100 functions as a source of pressure to provide a desired pressure level to the hydraulically operated one(s) of the wheel brakes 102A, 1028, 102C, and 102D during a typical or normal brake apply. After a brake apply, fluid from the hydraulically operated ones of the wheel brakes 102A, 1028, 102C, and 102D may be returned to the power transmission unit 104 and/or be diverted to the reservoir 106.

In the depicted embodiments, the power transmission unit 108 is shown as being a dual acting plunger ("DAP") type power transmission unit, though a single acting plunger ("SAP") or any other desired type of controllable hydraulic fluid pressurizer could be also or instead provided to the brake system 100. It is also contemplated that other configurations (not shown) of the brake system 100 could include hydraulic control of just a selected one of the pair of front wheel brakes and the pair of rear wheel brakes (with the other pair being electrically controlled/actuated). One of ordinary skill in the art would be readily able to provide such an arrangement for a desired use environment, following aspects of the present invention.

The Figures also depict a replenishing check valve 132, which is located fluidically between the reservoir 106 and the power transmission unit 104. When present, the replenishing check valve 132 may be provided to assist with refilling of the power transmission unit 104 (or components thereof) under predetermined conditions. For example, the replenishing check valve 132 may help to facilitate refilling of the chamber in front of the DAP head when a DAP-type power transmission unit 104 is building pressure during its retraction stroke by pushing fluid out of the annular chamber behind the DAP head. This may be done, for example, during slip control if additional flow to the brakes is needed after the DAP is stroked fully forward.

The brake system 100 also includes a plurality of iso/dump valve arrangements 134. Each iso/dump valve arrangement 134 is hydraulically interposed between the power transmission unit 104 and a corresponding one of the wheel brakes 102. The iso/dump valve arrangements 134 each include respective serially arranged iso and dump valves 136 and 138. The iso valve 136 for each iso/dump valve arrangement 134 is located hydraulically between a respective wheel brake 102 and the power transmission unit 104, and the dump valve 138 for each iso/dump valve arrangement 134 is located hydraulically between a respective wheel brake 102 and the reservoir 106, for the corresponding wheel brake 102. Here, for clarity in the Figures, the iso and dump valves 136 and 138 are appended with the letter "B" or "D", referencing a respective front wheel brake 102B and 102D, or the letter "A" or "C", referencing a respective rear wheel brake 102A and 102C, with which the so-labeled valves are respectively associated.

Thus, the iso/dump valve arrangements 134 downstream of the power transmission unit 104 each include iso and dump valves 136 and 138 which are controlled between their open and closed positions to provide different braking pressures among the wheel brakes 102, as desired for a particular braking situation. The iso/dump valve arrangements 134 may selectively provide slip control to at least one wheel brake 102 of the pair of front wheel brakes 102B, 102C and the pair of rear wheel brakes 102A, 102D powered by the power transmission unit 104. More broadly, the iso/dump valve arrangements 134, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking, particularly during normal non-failure mode operation of the brake system 100.

As depicted in the Figures, the brake systems 100 shown therein may have at least one iso/dump valve arrangement 134 including a normally open dump valve 138A, 138C for each wheel brake 102A, 102C of the pair of rear wheel brakes. The brake systems 100 shown in the Figures may instead be configured with at least one iso/dump valve arrangement 134 including a normally closed dump valve 1388, 138D for each wheel brake 1028, 102D of the pair of front wheel brakes, as desired for a particular use environment. The normally open ones of the dump valves 138 may help to provide any desired vent path from the corresponding brakes 102 and/or the power transmission unit 104 to the reservoir 106.

A normally closed DAP valve 140 may be interposed hydraulically between the power transmission unit 104 and the plurality of iso/dump valve arrangements 134. When present, the normally closed DAP valve 140 (which is usually energized open) may assist the power transmission unit 104 in acting like a single acting plunger type power transmission unit when the DAP valve 140 is open. The DAP valve 140 can be closed to invoke the "pumping action" rearward travel of the dual-acting plunger type power transmission unit 104, in a known manner. If the normally closed DAP valve 140 fails—in the circuit shown in FIG. 1—the rear wheel brakes 102A, 102C may become unavailable under certain use conditions, but the driver will still be able to utilize the front brakes 1028, 102D in the manual push-through mode, via the master cylinder 110.

At least one fluid separator (two shown, at 142) may be provided to the brake system 100. When present, each fluid separator 142 is hydraulically interposed between a selected one of the pair of front wheel brakes 1028, 102D and a corresponding iso/dump valve arrangement 1348, 134D, as indicated by the "B" and "D" suffixes on the fluid separator 142B, 142D. Each fluid separator 142B, 142D may include a fluid separator piston 144 which is spring-biased toward a first end (the right end, in the orientation of the Figures) of a fluid separator chamber 146. The fluid separator piston 144 travels reciprocally longitudinally between the first end and a second end (the left end, in the orientation of the Figures) of the fluid separator chamber 146 when the brake system 100 is in a in normal non-failure braking mode, responsive to fluid pressure and other changes within the iso/dump valve arrangements 134 or other portions of the brake system 100, occasioned by the power transmission unit 104.

In contrast, the fluid separator piston 144 is maintained substantially adjacent the first end of the fluid separator chamber 146 in manual push-through braking mode, such that a separator port 148 of each fluid separator piston 144 is available to place the separator conduit 150 in fluid communication with each of the pair of front wheel brakes 102B, 102D. Since the separator conduit 150 is in fluid communication with the master cylinder output 118, the master cylinder 110, as a result, may function as a source of pressure to provide a desired pressure level in a manual push-through mode of operation to at least a selected one of the pair of front wheel brakes 102B and 102D (to both, in the brake system 100 shown in the Figures). This manual push-through may be used in a backup or "failed" situation, when, for some reason, the power transmission unit 104 is unable to provide fluid to those selected wheel brakes. The manual push-through may also or instead be used to test system capacity as a part of normal operation, though such use case will not be discussed further herein.

In order to facilitate operation of the brake system 100 in the manual push-through mode, a normally open base brake iso valve 152 is provided. The base brake iso valve 152 is energized closed during normal non-failure braking mode. The base brake iso valve 152 can then be opened, either electrically or by cessation of electrical power, to place the master cylinder 110 into fluid communication with at least one of the fluid separators 142B, 142D during manual push-through braking mode. The fluid separators 142B, 142D can then be used to help switch the front wheel brakes 102B, 102D into their manual push-through mode of operation, as described above. The base brake iso valve 152 may include a check valve feature, as indicated schematically in the Figures, which seals only in one direction across the valve 152.

At least one electronic control unit ("ECU") 154 may be provided for selectively controlling at least one of the power transmission unit 104, one or more of the plurality of iso/dump valve arrangements 134, and the base brake iso valve 152 responsive to the brake signal generated by the master cylinder 110 responsive to pressure upon the brake pedal 114 by the driver of the vehicle. As shown in the Figures, the brake system 100 may have a first electronic control unit 154A, as well as a second electronic control unit 154B for selectively controlling at least one of the power transmission unit 104, one or more of the plurality of iso/dump valve arrangements 134, and the base brake iso valve 152 responsive to the brake signal. The ECUs 154A, 154B may each control different ones of the electrically powered and/or controlled portions of the brake system 100, or may each be configured to control one or more of the same component(s) of the brake system 100, at different times, such as by providing redundant control in the event of failure of one of the ECUs 154A, 154B. The iso/dump valve arrangements 134 may each be controlled, for example by the first and/or second ECU 154A, 154B.

The ECUs 154A, 154B may include microprocessors and other electrical circuitry. The ECUs 154A, 154B receive various signals, process signals, and control the operation of various electrical components of the brake system 100 in response to the received signals, in a wired and/or wireless manner. The ECUs 154A, 154B can be connected to various sensors such as the reservoir fluid level sensor 108, pressure sensors, travel sensors, switches, wheel speed sensors, and steering angle sensors. The ECUs 154A, 154B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 154A, 154B may be connected to the instrument cluster for collecting and supplying information related to warning indicators such as an ABS warning light, a brake fluid level warning light, and a traction control/vehicle stability control indicator light.

As shown (optionally, as indicated in dashed lines) in the Figures, a pair of rear brake motors 156A, 156C may be provided for selectively electrically actuating respective rear wheel brakes 102A and 102C, at least in a parking brake mode which acts in a complementary manner to the hydraulically actuated surface brakes 102A, 102C. Whether or not the rear brake motors 156A, 156C function during normal non-failure braking as parking brakes, however, the rear brake motors 156A, 156C could be used in a backup mode as electrically actuated substitutes for the hydraulically operated pair of rear wheel brakes 102A, 102C when hydraulic operation of the rear wheel brakes is not available, for some reason. Accordingly, at least a selected electronic control unit 154A, 154B may be provided for controlling at least one of the power transmission unit 104 and the pair of rear brake motors 156 (e.g., in a normal non-failure braking mode), and the other electronic control unit 154A, 154B may be provided for controlling at least one of the base brake iso valve 152 and the pair of rear brake motors 156 (e.g., in a backup braking mode), though it is contemplated that a selected one of the electronic control units 154 could control the rear brake motors 156 in both modes of operation.

With reference now to FIG. 2, the brake system 100 of FIG. 1 is shown as including separation of the various components (hydraulically if not also mechanically) into separate modules or units, with each module being schematically delineated by one of dashed-line boxes A and B. The delineation noted in FIG. 2 by boxes A and B indicates a physical separation of the components thus indicated (i.e., by being located remote from one another within the brake system 100, and at least apart from a common housing or block), which may be desirable in certain use environments. For example, the components in box A could be located immediately adjacent to a dashboard of the vehicle, with the linkage arm 122 extending through the vehicle firewall (not shown). The components in box A would then be hydraulically linked to "remotely" located components in box B. stated otherwise, and for example, the reservoir 106 and master cylinder 110 may be co-located and both spaced apart from the power transmission unit 104, fluid separators 142, and iso/dump valve arrangements 134. As such, the brake system 100 shown in FIG. 2 may be suited for use in a particular vehicle configuration in which such physical separation of the box A module components from the box B module components is desirable.

Figure 3:
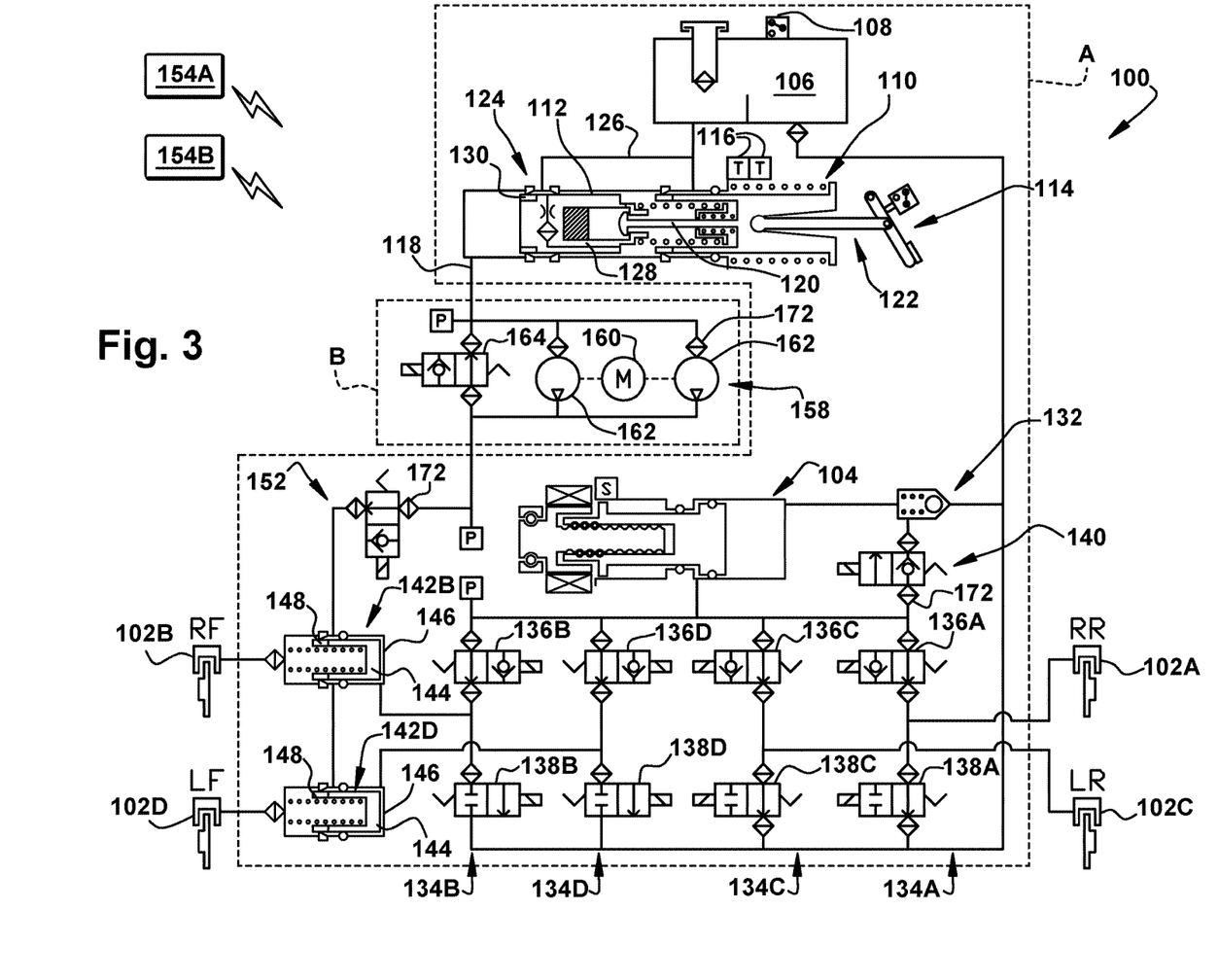
FIG. 3 is a schematic hydraulic diagram of a brake system according to an aspect of the present invention, in a first configuration.
Figure 4:
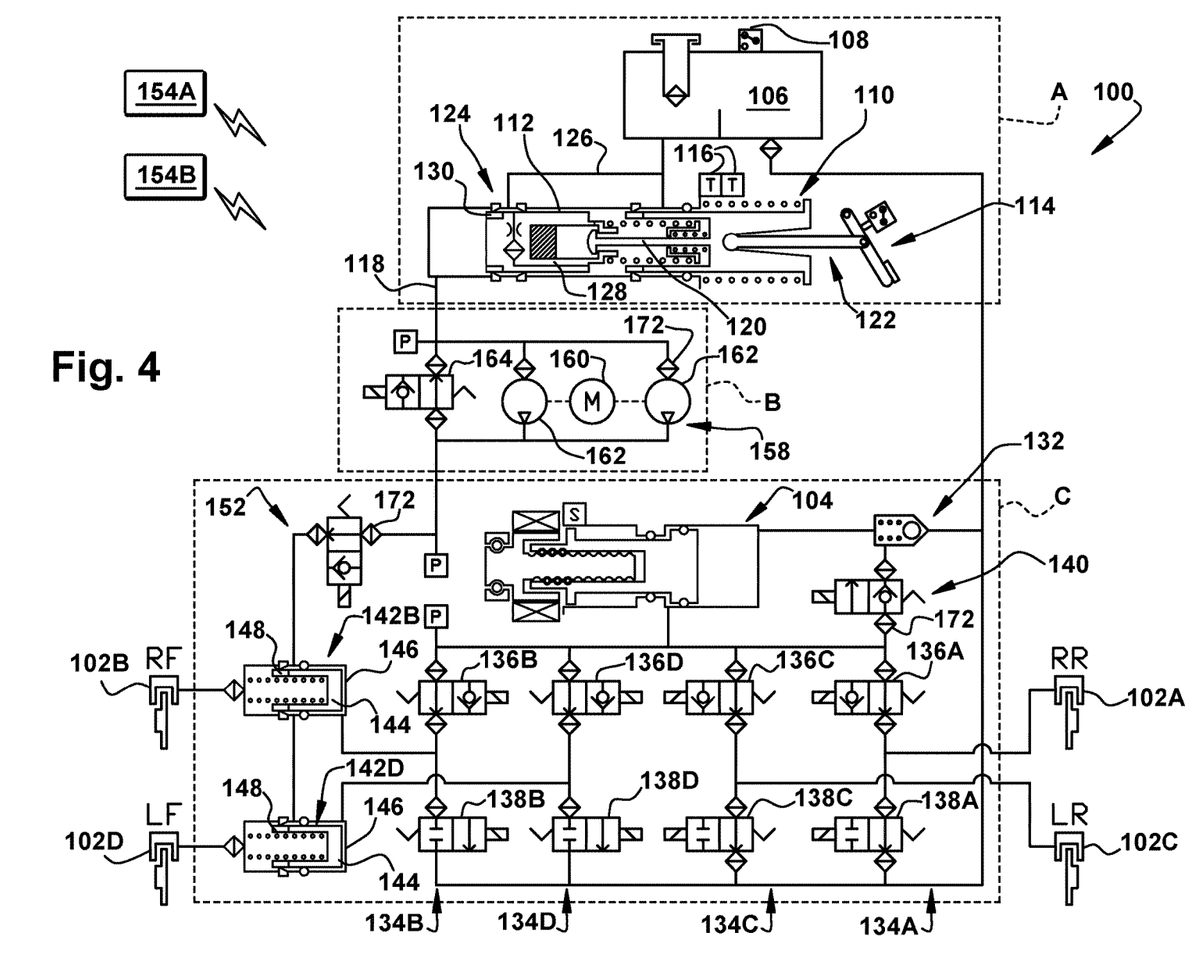
FIG. 4 is a schematic hydraulic diagram of the brake system of FIG. 3, in a second configuration.

FIGS. 3-4 illustrate a second embodiment of a brake system 100. The brake system 100 of FIGS. 3-4 is similar to the brake system 100 of FIGS. 1-2 and therefore, structures of FIGS. 3-4 that are the same as or similar to those described with reference to FIGS. 1-2 have the same reference numbers. Description of common elements and operation similar to those in the previously described first embodiment will not be repeated with respect to the second embodiment, but should instead be considered to be incorporated below by reference as appropriate.

As shown in FIG. 3, the brake system 100 may include a secondary brake module 158 of any desired type interposed hydraulically between the master cylinder 110 and the base brake valve 152. The secondary brake module 158 shown in FIG. 3 includes an electric motor 160 and at least one pump chamber of any desired type (shown here as at least one pump piston 162) for cooperatively increasing fluid pressure between the master cylinder 110 and the base brake valve 152 when the brake system 100 is in at least one of normal non-failure braking mode and manual push-through mode. A secondary iso valve 164 may be provided to assist with directing hydraulic fluid among the pump pistons 162 and other components of the brake system 100, as desired. It is contemplated that the secondary brake module 158 could also or instead include at least one of a single-acting plunger type power transmission unit, a dual-acting plunger type power transmission unit, or any other desired mechanism(s) or component(s) for selectively increasing fluid pressure. One of ordinary skill in the art can readily provide a suitable secondary brake module 158 for a particular use environment of the brake system 100.

The secondary brake module 158 may be configured for selectively providing pressurized hydraulic fluid for actuating the pair of front wheel brakes 102B and 102D, when the brake system 100 is in any mode in which a pressure "boost" to one or more corresponding wheel brake(s) 102 (as shown in the brake system 100 of FIG. 3, just the front wheel brakes 102B, 102D) is desirable. That is, the secondary brake module 158 could be used only when the brake system 100 is in the manual push-through mode, to supplement the pressure applied by the driver, via the brake pedal 114 of the master cylinder 110. It is also contemplated, though, that the secondary brake module 158 could be used when the brake system 100 is in the normal non-failure braking mode, to provide a "backup boost" pressure build, supplemental to pressure achieved by the power transmission unit 104. The secondary brake module 158 could also or instead act to translate a brake signal from an autonomous braking system source (not shown) into brake-application pressure directed to one or more wheel brakes 102, even without a driver's foot pressure upon the brake pedal 114.

One of ordinary skill in the art will be able to assign all components of the brake system 100 to an appropriate one (or more) of the electronic control units 154A, 154B (when more than one are provided) for a particular brake system 100, in order to achieve desired redundant and backstopping functionability. For example, it may be desirable for the secondary brake module 158 to be powered and/or controlled by a different electronic control unit 154 then that which powers and/or controls at least one of the power transmission unit 104, iso/dump valve arrangements 134, and/or base brake iso valve 152.

As shown by dashed-line boxes A and B in FIG. 3, the secondary brake module 158 may be spaced physically apart from one or more of the power transmission unit 104, master cylinder 110, fluid separators 142, and iso/dump valve arrangements 134. This physical separation may be provided for any desirable reason, and appropriate hydraulic and/or electrical lines may be used to connect the various spaced-apart components, for operation of the brake system 100 as desired.

With reference now to FIG. 4, the brake system 100 of FIG. 3 is shown as including a differently arranged (from FIG. 3) separation of the various components—hydraulically if not also mechanically—into separate modules or units. Each module is schematically delineated by one of dashed-line boxes A, B, and C. The delineation noted by boxes A and B in FIG. 3—boxes A, B, and C in FIG. 4—indicates a physical separation of the components thus indicated (i.e., by being located remote from one another within the brake system 100, and at least apart from a common housing or block), which may be desirable in certain use environments. For example, the components in box A could be located immediately adjacent to a dashboard of the vehicle, with the linkage arm 122 extending through the vehicle firewall (not shown). The components in box A would then be hydraulically linked to "remotely" located components in box B and/or box C. Stated otherwise, and in the example shown in FIG. 4, the reservoir 106 and master cylinder 110 may be co-located and both spaced apart from the power transmission unit 104, fluid separators 142, and iso/dump valve arrangements 134, which may, in turn, also be spaced physically apart from the secondary brake module 158. As such, the brake system 100 shown in FIG. 4 may be suited for use in a particular vehicle configuration in which such physical separation of the box A module components from both of the box B module components and box C module components is desirable.

At least one filter 172 may be provided in any desired position(s) within the brake systems 100 of FIGS. 1-4.

Pressure of hydraulic fluid within the brake systems 100 of FIGS. 1-2 could be sensed, directly or indirectly, with a pressure sensor (shown generally as "P") at any desired location(s) in the brake systems 100. It is contemplated that the pressure sensor(s) will be in electrical communication with at least one of the primary and secondary ECUs 154A, 154B, in a wired or wireless manner, to communicate pressure signals thereto responsive to sensed fluid pressure(s).

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating at least one of a pair of front wheel brakes and a pair of rear wheel brakes in normal non-failure and manual push-through modes, the system comprising:
   a reservoir;
   a master cylinder operable to provide a brake signal responsive to actuation of a brake pedal connected thereto, the master cylinder being selectively operable during a manual push-through mode by actuation of the brake pedal to generate brake actuating pressure to at least one output for hydraulically actuating the pair of front wheel brakes;
   a power transmission unit configured for selectively providing pressurized hydraulic fluid for actuating at least one of the pair of front wheel brakes and the pair of rear wheel brakes in a normal non-failure braking mode;
   a plurality of iso/dump valve arrangements, each iso/dump valve arrangement being hydraulically interposed between the power transmission unit and a corresponding one of the wheel brakes;
   a plurality of fluid separators, each fluid separator being hydraulically interposed between a selected one of the pair of front wheel brakes and a corresponding iso/dump valve arrangement, each fluid separator isolating the fluid within the corresponding iso/dump valve arrangement from the master cylinder;
   a normally open base brake iso valve, the base brake iso valve being energized closed during normal non-failure braking mode and the base brake iso valve being open to place the master cylinder into fluid communication with at least one of the fluid separators during manual push-through braking mode; and
   an electronic control unit for selectively controlling at least one of the power transmission unit, at least one of the plurality of iso/dump valve arrangements, and the base brake iso valve responsive to the brake signal.

2. The brake system of claim 1, wherein the primary power transmission unit is of a dual acting plunger type.

3. The brake system of claim 1, wherein the master cylinder includes a housing defining a longitudinally extending bore, and an MC spring within the bore.

4. The brake system of claim 1, wherein the master cylinder includes an integrated pedal simulator for providing predetermined brake pedal response.

5. The brake system of claim 4, wherein the pedal simulator is coaxial with a longitudinally extending bore of the master cylinder.

6. The brake system of claim 1, including a normally closed DAP valve interposed hydraulically between the power transmission unit and the plurality of iso/dump valve arrangements.

7. The brake system of claim 1, wherein at least one iso/dump valve arrangement includes a normally open dump valve for each wheel brake of the pair of rear wheel brakes.

8. The brake system of claim 1, wherein at least one iso/dump valve arrangement includes a normally closed dump valve for each wheel brake of the pair of front wheel brakes.

9. The brake system of claim 1, wherein each fluid separator includes a fluid separator piston spring-biased toward a first end of a fluid separator chamber.

10. The brake system of claim 9, wherein each fluid separator piston travels longitudinally between a first end and a second end of each fluid separator chamber in normal non-failure braking mode, and wherein each fluid separator piston is maintained substantially adjacent each first end in manual push-through braking mode.

11. The brake system of claim 1, wherein the electronic control unit is a first electronic control unit, and wherein the brake system includes a second electronic control unit for selectively controlling at least one of the power transmission unit, at least one of the plurality of iso/dump valve arrangements, and the base brake iso valve responsive to the brake signal.

12. The brake system of claim 1, wherein the base brake iso valve includes a check valve feature sealing only in one direction.

13. The brake system of claim 1, including a secondary brake module interposed hydraulically between the master cylinder and the base brake valve.

14. The brake system of claim 13, wherein the secondary brake module includes an electric motor and at least one pump chamber for cooperatively increasing fluid pressure between the master cylinder and the base brake valve during at least one of normal non-failure braking mode and manual push-through mode.

15. The brake system of claim 1, wherein the reservoir and master cylinder are co-located and both spaced apart from the power transmission unit, fluid separators, and iso/dump valve arrangements.

16. The brake system of claim 13, wherein the secondary brake module is spaced apart from the power transmission unit, master cylinder, fluid separators, and iso/dump valve arrangements.

17. The brake system of claim 16, wherein the reservoir and master cylinder are co-located and both spaced apart from the power transmission unit and iso/dump valve arrangements.

18. The brake system of claim 1, wherein the base brake iso valve is in fluid communication with the master cylinder and is fluidically spaced from the power transmission unit.

19. The brake system of claim 1, wherein each fluid separator is in fluid communication with the corresponding iso/dump valve arrangement through a first conduit and in fluid communication with the base brake iso valve and the master cylinder through a second conduit hydraulically spaced from the first conduit.

* * * * *